United States Patent
Hyde et al.

[11] 3,879,653
[45] Apr. 22, 1975

[54] MICROWAVE SPECTROMETER EMPLOYING A BIMODAL CAVITY RESONATOR

[75] Inventors: James S. Hyde, Menlo Park; Martin A. Huisjen, Palos Verdes, both of Calif.

[73] Assignee: Varian Associates, Palo Alto, Calif.

[22] Filed: Feb. 6, 1974

[21] Appl. No.: 440,108

[52] U.S. Cl. ............................................. 324/.5 R
[51] Int. Cl. ........................................... G01n 27/78
[58] Field of Search ............... 324/.5 R, .5 A, .5 AC, 324/.5 AH

[56] References Cited
UNITED STATES PATENTS

| | | | |
|---|---|---|---|
| 3,559,043 | 1/1971 | Hyde | 324/.5 R |
| 3,581,190 | 5/1971 | Brown | 324/.5 R |
| 3,609,520 | 9/1971 | Sneed | 324/.5 R |

OTHER PUBLICATIONS

K. D. Bowers, W. B. Mims; — Paramagnetic Relaxation In Nickel Fluosilicate — Physical Review — 115(2) — July 15, 1959 — pp. 285–295.

P. L. Scott, C. D. Jeffries; — Spin Lattice Relaxation In Some Rare Earth Salts At Helium Temperatures — Physical Review — 127(1) — July 1, 1962 — pp. 32–51.

Primary Examiner—Michael J. Lynch
Attorney, Agent, or Firm—Stanley Z. Cole; Gerald M. Fisher; John J. Morrissey

[57] ABSTRACT

A pulsed electron paramagnetic resonance spectrometer employs a bimodal sample cavity. Coherent microwave power from a common source is applied to the cavity for exciting and observing resonance of the sample via separate pumping and observing microwave channels. An automatic frequency control circuit locks the frequency of the common source to the resonant frequency of the observing mode of the bimodal cavity. All modulating frequencies, delays, pulse repetition rates, etc. are derived from a master clock. Free induction decay resonance signals are separated from saturation-recovery resonance signals in the observing channel by proper adjustment of the relative phases at a detector crystal in the observing channel of a reference microwave signal, a cross-coupled pump signal, and a signal reflected from the observing cavity mode, and by furthermore adjusting the polarizing magnetic field to the center of a resonance line. The proper phase adjustment yields a dispersion free induction decay signal and an absorption saturation recovery signal. Alternatively or in combination with the first method, saturation recovery signals are separated from the free induction decay signals detected in the observing channel by modulating the observing power level from a nonsaturating microwave power level to a still lower power level at a low modulation frequency. The detected resonance signal is then phase sensitive detected at the modulation frequency to detect the saturation recovery signal to the exclusion of the free induction decay signal.

13 Claims, 1 Drawing Figure

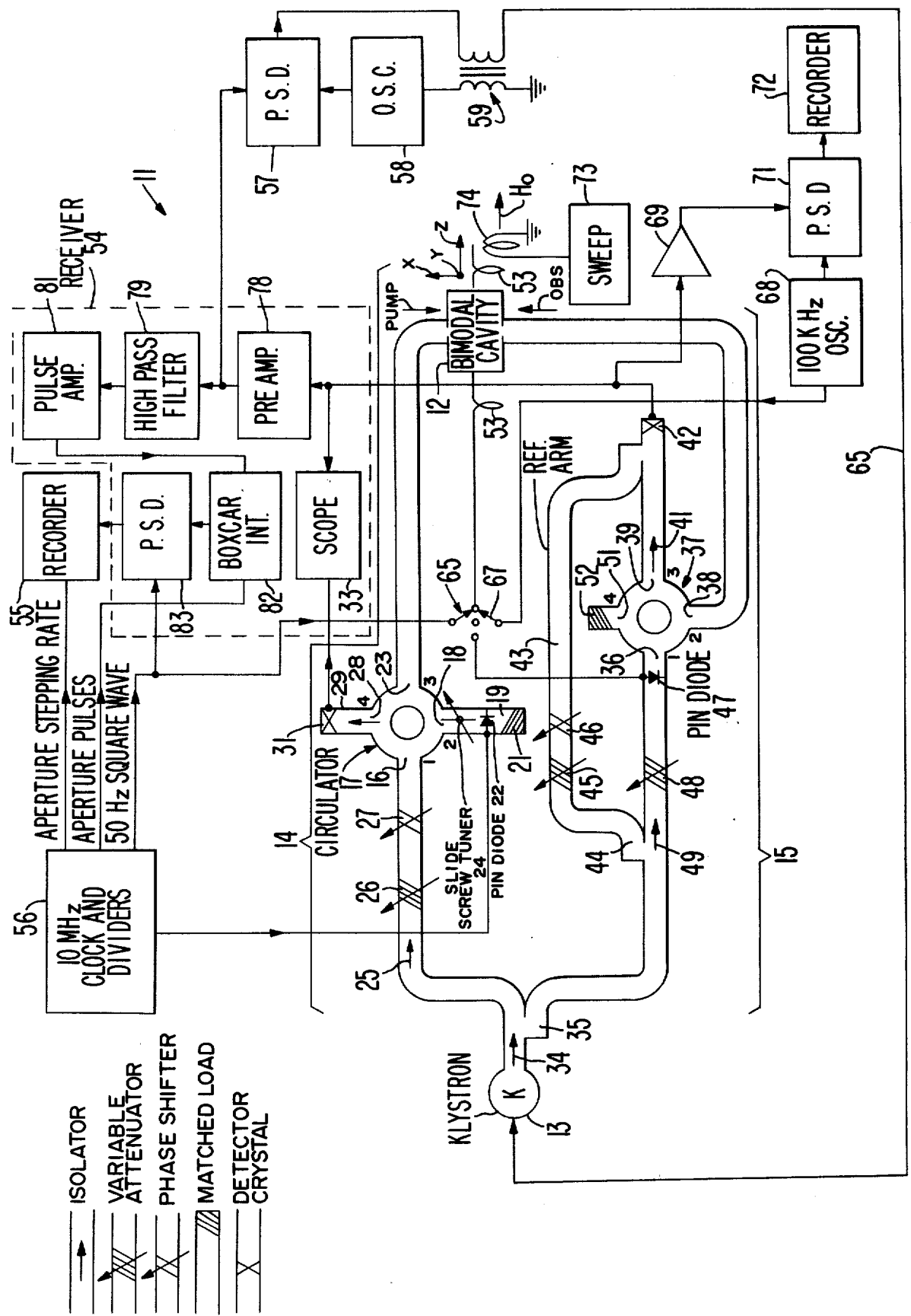

MICROWAVE SPECTROMETER EMPLOYING A BIMODAL CAVITY RESONATOR

BACKGROUND OF THE INVENTION

The present invention relates in general to electron paramagnetic resonance spectrometers, and more particularly to such spectrometers employing a bimodal sample cavity resonator excited with pumping microwave energy and observing microwave energy of orthogonal modes of oscillation within the cavity.

DESCRIPTION OF THE PRIOR ART

Heretofore, electron paramagnetic resonance spectrometers have been proposed employing a bimodal sample cavity resonator dimensioned and arranged to support two orthogonal modes, such modes having a common shared region in which the sample under analysis is disposed. The sample is irradiated with pumping microwave energy coupled to one of the modes of oscillation of the cavity, via a pumping microwave channel. Resonance was observed by exciting the second orthogonal mode of the resonator with microwave energy generally of a lower power level and derived from a second microwave source and fed to the cavity via an observing microwave channel. Resonance was detected by a microwave detector in the observing channel. Such a spectrometer is disclosed in U.S. Pat. No. 3,559,043 issued Jan. 26, 1971 and assigned to the same assignee as the present invention.

It is also known from the prior art to provide an electron paramagnetic resonance spectrometer with a microwave reflection cavity bridge. The bridge includes a four port circulator having a source of microwave power applied to a first port, a matched sample cavity resonator coupled to a second port, and a detector coupled to a third port with a reference channel interconnecting the microwave source and the micrwave detector for providing a reference phase for the detector. Such a microwave reflection cavity bridge is disclosed in U.S. Pat. No. 3,714,550 issued Jan. 30, 1973 and assigned to the same assignee as the present invention.

Moreover, it is also known from the prior art to employ a bimodal cavity in a pulsed electron paramagnetic resonance spectrometer. In one of these prior art spectrometers, the magnetization of the sample located within a pumping mode of the bimodal cavity is inverted by applying a 180° microwave pulse to the sample. Recovery of the spin systems is monitored by a weak nonsaturating observing source of microwave power applied to the observing mode of the bimodal cavity. However, in this prior spectrometer the observing and pumping sources were incoherent, that is, they were not derived from the same source of microwave energy and were not coherent in the sense of employing the same identical frequency for both the pumping and observing modes. Such a spectrometer is disclosed in Physical Review Letters, 2, 88 (1959), in an article authored by S. A. Collins, Jr., R. L. Kyle and M. W. P. Strandberg.

Pulsed EPR experiments historically have been of several types, namely; spin-echo, saturation-recovery, free induction decay and Torrey oscillations. Apparatus designed for one such application may frequently be suitable for others. In particular, the apparatus described here has been used for observation of saturation-recovery, free induction decay and Torrey oscillations. Its primary purpose, however, is to measure spin lattice relaxation times using the saturation-recovery technique. In this method the populations of two levels are altered from the equilibrium Boltzman populations by an intense pumping radio frequency field, and the recovery towards thermal equilibrium is monitored with a weak observing microwave field. The saturation-recovery technique was first described by C. F. Davis, Jr., M. W. P. Strandberg, and R. L. Kyle, Physical Review, *111*, 1268 (1958).

In addition, it is known from the prior art of pulsed electron paramagnetic resonance spectrometers employed for oserving saturation-recovery effects to utilize a common source of microwave power for both the pumping and observing channels. These spectrometers used both transmission and reflection type cavities but not bimodal cavities. Such spectrometers employing a common coherent source for the pumping and observing channels are described in articles by K. D. Bowers and W. B. Mims, Physical Review 115, 285 (1959) and in an article by P. L. Scott and C. D. Jeffries appearing in Physical Review, *127*, 32 (1962).

Central problem encountered in pulsed electron paramagnetic resonance experiments is that it is very difficult to deliver a pulse that will result in negligible projection of the electron spin magnetization M on the X-Y plane in the rotating frame, i.e., $M_x$ and $M_y$. This is primarily because the available RF field intensity $H_1$ is much less than the spectral widths, and often less than the width of inhomogeneously broadened hyperfine lines. If $M_x$ and $M_y$ are finite after the pumping microwave pulse, there will be a free induction decay signal that may compete with the saturation-recovery signal. Free-induction decay is the time evolution towards zero intensity of the observable components of the magnetization, $M_x$ and $M_y$, in the absence of any microwave power incident on the sample. It is a transverse relaxation process or a dephasing of the spins. If there is a free-induction signal, it will be superimposed on the saturation-recovery signal in coherent spectrometers, and in incoherent spectrometers will result in a beat. This problem does not previously appear to have been recognized, possibly because dephasing times were much shorter than spin-lattice relaxation times in the samples actually studied.

Thus, there is a need for an improved electron paramagnetic resonance spectrometer having means for separating the free-induction decay signal from the saturation-recovery signal. Such a spectrometer is especially useful for time-domain electron paramagnetic resonance studies on samples of chemical and biological interest, particularly free radicals in solution and nitroxide radical spin-labelled biomolecules. Interest in chemical and biological applications implies, from an instrumental point of view, need for fast response on the order of 0.1 to 1 microsecond, and need for high sensitivity.

SUMMARY OF THE PRESENT INVENTION

The principal object of the present invention is the provision of an improved microwave spectrometer employing a bimodal sample cavity resonator and which is particularly suitable for separating the free-induction-decay signal from the saturation-recovery signal.

In one feature of the present invention, the sample is located within the shared region of a bimodal cavity of the type dimensioned and arranged to support two orthogonal modes at the same frequency and wherein pumping microwave energy for exciting resonance of the sample and observing microwave energy for observing resonance of the sample are derived from a common microwave source.

In another feature of the present invention, a microwave detector in the observing channel has the phase of a reference microwave signal, derived directly from the common microwave source, adjusted relative to the phase of pumping mode energy coupled via the sample into the detector for detecting the dispersion mode of the free-induction-decay signal, and furthermore the intensity of the polarizing magnetic field is adjusted to the center of a resonance line, whereas the phase of the observing mode resonance signal is adjusted at the detector relative to the reference phase for detecting the absorption mode of the sample, whereby the saturation-recovery signal is separated from the free-induction-decay signal.

In another feature of the present invention, the free-induction-decay signal is separated from the saturation-recovery signal by modulating the power level of the observing mode microwave energy applied to the sample from a nonsaturating microwave level to a still lower level at a given modulation frequency and the observing mode resonance signal is phase sensitive detected at the modulation frequency for separating the free-induction-decay signal from the saturation-recovery signal, since the free-induction-decay signal level is not dependent on the observing power level, whereas the saturation-recovery signal is so dependent.

In another feature of the present invention, the various modulation frequencies and timing periods utilized in the spectrometer are derived from a common clock, whereby certain undesired beat frequencies and harmonics thereof are eliminated in the detected resonance signals.

Other features and advantages of the present invention will become apparent upon a perusal of the following specification taken in connection with the accompanying drawing wherein:

BRIEF DESCRIPTION OF THE DRAWING

The drawing is a schematic circuit diagram, partly in block diagram form, of a pulsed electron paramagnetic resonance spectrometer incorporating features of the present invention.

DESCRIPTION OF THE PREFERRED EMBODIMENTS

Referring now to the drawing, there is shown a pulsed electron paramagnetic resonance spectrometer 11 incorporating features of the present invention. A sample of matter to be investigated is disposed within a bimodal cavity resonator 12. Bimodal cavity 12 is of the type disclosed and claimed in U.S. Pat. No. 3,559,043 issued Jan. 26, 1971 and assigned to the same assignee as the present invention. The disclosure of the subject patent is hereby incorporated by reference for a complete disclosure of the bimodal cavity.

The bimodal cavity is designed to support two orthoganal modes of oscillation at the same frequency, and includes a shared region and a pair of unshared regions with the sample disposed along the Y axis normal to the direction of the polarizing field $H_o$ in the shared region of the cavity. The sample is subjected to the alternating microwave magnetic fields of both orthogonal modes of oscillation of the cavity. A strong polarizing magnetic field $H_o$ is directed through the sample and such that in the sample both microwave magnetic fields are at an angle to the polarizing field $H_0$. Microwave energy is supplied to the cavity 12 along the X axis from opposite ends for exciting the orthogonal modes of oscillation of the cavity 12. A source of microwave energy 13, such as a klystron reflex oscillator 34 excites a pump channel 14, and an observing microwave channel 15.

In the pump channel 14, microwave energy is fed from the klystron 13 through isolator 34 to one input port 16 of a microwave circulator 17. Microwave energy entering the circulator 17 at port 16 travels around the circulator in the counter-clockwise direction by port 18 and exits to the bimodal cavity 12 via port 23. Port 18 is coupled to a microwave stub portion 19 terminated in a matched load 21 and has a PIN diode 22 disposed within the stub 19 in such a manner as, when rendered conductive, to reflect microwave energy back toward the circulator through port 18 and thence out of port 23 and, when rendered nonconductive, to allow the energy to pass into matched attenuator or load 21. A slide screw tuner 24 is located in stub 19 between the PIN diode 22 and port 18 of the circulator for matching the impedance of the PIN diode 22. An isolator 25, variable attenuator 26 and variable phase shifter are provided in the pump channel 14 between the source and the circulator 17 for preventing unwanted reflection of pump energy into the source 13 and observing channel 15 while allowing variation of the phase and amplitude of the pump energy.

Microwave energy reflected from the bimodel cavity 12 passes back through the pump channel 14 to port 23 of the circulator 17 and thence, in the counter clockwise direction, to port 28 and thence into arm 29. Arm 29 contains a matched microwave crystal detector 31 for detection of the reflected microwave energy. The detected signal is thence fed via a line 32 to one input of an oscilloscope 33 for display.

In the observing channel 15, microwave energy is coupled from the output of the kystron 13 and isolator 34 via a directional coupler 35 into the observing channel 15. Thence the microwave energy is fed to one input part 36 of a second microwave circulator 37. Microwave energy entering the circulator 37 at port 36 is propagated in the counter clockwise direction around the circulator and out of port 38 and thence via a waveguide to the second or observing mode of the bimodal cavity 12. Microwave energy reflected from the bimodal cavity 12 passes back through the observing channel 15 into the circulator 37 via port 38. Within the circulator 37, the reflected observing microwave power propagates around the circulator in the counter clockwise direction and exits from port 39 and thence is fed via an isolator 41 to a microwave crystal detector 42 for detection A reference phase of microwave energy is applied to the crystal detector 42 via a reference microwave arm 43 which bypasses the circulator 37 and is connected to the observing channel waveguide at its upstream end via a directional couple 44. The reference arm 43 includes a variable attenuator 45 for controlling the level of microwave power applied to the crystal detector 42, and a variable phase shifter 46 for controlling the phase of the reference microwave energy applied to the detector 42.

A PIN diode 47 is provided between the input port 36 of circulator 37 and the klystron 13 for modulating the amplitude of microwave power passing through the observing channell 15 from the klystron 13 to the bimodal cavity 12. A variabale attenuator 48 is provided between the circulator 37 and the klystron 13 for variably adjusting the power level of microwave energy propagating from the klystron 13 to the bimodal cavity 12. An isolator 49 is provided between the klystron and the variable attenuator 48 to prevent reflection of microwave energy back to the klystron 13. A fourth port 51 of the circulator 37 is terminated in a matched load 52.

A pair of field modulation coils 53 are disposed adjacent or within the bimodal cavity 12 for superimposing a component of magnetic field parallel to $H_o$ on the polarizing magnetic field $H_o$. A receiver 54 is connected for detection of resonance signals picked up by detector 42 to produce an output which is recorded on recorder 55 as a function of time or of other signals as desired. A clock and dividers 56 serve to provide a number of various timing signal outputs fed to various elements of the receiver and pump arm for timing the pulses of pump energy applied for exciting the sample, for timing certain functions of the receiver 54, and for modulating the field via field modulation coil 53 or modulating the amplitude of the observing microwave energy via modulation applied to PIN diode 47. These various modulation techniques and receiving techniques will be described in greater detail below.

In addition, an automatic frequency control circuit is provided which derives a detected resonance output signal from the receiver 54 and feeds it to one input of a phase sensitive detector 57 and feeds it to one input of a phase sensitive detector 57 for comparison with a reference signal derived from an oscillator 58. The oscillator also serves to modulate the frequency of the microwave energy derived from source 13 via a transformer coupling 59 and a secondary lead 61 connected to a frequency control or reflector voltage of a reflex klystron oscillator when serving as source 13. Frequency modulation of the source 13 about its center or carrier produces a detected resonance signal component at that frequency which is phase sensitive detected in phase sensitive detector 57 to produce a DC error signal also applied to the frequency control or reflector voltage of the klystron 13 via lead 61 for locking the carrier frequency of the klystron 13 to the center of a resonance line of the sample, as observed by the detector 41 in the observing channel 15.

The electron paramagnetic resonance spectrometer 11 can be utilized in a number of different modes such as either a CW mode or a transient mode. The spectrometer shown in the drawing is particularly well suited for analyzing transient resonance signals and particularly for separating the transient free-induction-decay resonance signal from the transient saturation-recovery signal. In order to separate the two signals, the spectrometer is initially set up by operation in a CW mode and the parameters are set for detection, in detector 42, with observing power off or low at the center of a dispersion resonance line of the sample under analysis. In this manner, when operating in the transient mode, the free-induction-decay signal as coupled from the pump channel into the observing channel due to resonance of the sample is of zero amplitude and thus will not interfere with detection of the saturation-recovery signal monitored by observing power in the observing channel.

To initially set the parameters of the spectrometer to the center of a dispersion resonance line of the sample under analysis, switch 65 is set to the center position to disconnect the 50 hertz square wave output of clock 56 from the field modulation coil 53. Switch 67 is set for connecting the output of a 100 kilohertz oscillator 68 to the modulation coils 53. The detected signal output of detector 42 is amplified in amplifier 69 and fed to one input of a phase sensitive detector 71 for phase sensitive detection against a sample of the 100 kilohertz oscillator output to derive a DC resonance signal which is recorded in recorder 72. Attenuator 26 in pumping 48 in observing adjusted for maximum attenuation, and attenuator 48 in observing arm 15 is set at a level adequate for detection of magnetic resonance of a sample disposed in the bimodal cavity 12.

The resonance signal that is recorded in recorder 72 due to the modulation of the DC polarizing field by oscillator 68 is the first derivative of the respective resonance line signal being detected. A magnetic field sweeping unit 73 controls the magntiude of the polarizing magnetic field $H_o$ as produced by an electromagnet and indicated by coil 74. Thus, the operator adjusts the phase of phase shifter 46 in the reference arm 43 for pure absorption mode resonance.

Next, the microwave energy transmitted from the klystron 13 to the bimodal cavity via the observing channel is essentially turned off by adjusting the attenuator 48 in the observing arm to highly attenuate the observing energy. Attenuator 26 in the pump channel is then adjusted for substantial power in the power arm. Then CW resonance of the sample is detected at the observing crystal 42 by transmission from the pump arm via the cavity to the detector 42. Phase shift 27 in the pump arm is varied for detection of pure absorption mode resonance of the sample in the observing channel at detector 42.

Next, attenuator 48 in the observing channel is adjusted until the absorption mode signal from the pump channel as coupled into the detector 42 in the observing channel 15 is equal and opposite in amplitude to the absorption resonance signal as detected in the observing channel 15 at detector 42. If necessary, phase shifter 27 in the pump arm 14 is shifted by 180° to obtain cancellation of the signals.

Phase shifter 27 in the pump channel 14 is preferably a calibrated phase shifter such that the phase can be shifted as desired. The calibrated phase shifter 27 in the pump arm channel 14 is then shifted by 90° so that the resonance signal detected in the detector 42 due to the coupling of pump energy through the bimodal cavity at resonance corresponds to the dispersion mode signal. The polarizing magnetic field $H_o$ is set at the crossover or zero of a dispersion resonance line. The power in the observing channel is then adjusted to a small nonsaturating level by increasing the attenuation of attenuator 48. In this manner, the spectrometer is then set for a zero of the dispersion mode of the pump energy coupled through the sample at resonance to the detector 42, and the observing channel is set for the absorption, mode resonance signal as reflected back into the observing arm by resonance of the sample.

Switch 67 is then switched to the center or "off" position and switch 65 is switched for connecting the field modulating coils 53 to the 50 hertz square wave output of the clock and dividers 56. Another output of the clock 56 is also fed to the PIN diode 22 in the pump channel for pulsing the pump energy at a convenient pump pulse repetition rate as of 6.25 to 50 kilohertz. This results in operation of the spectrometer 11 in the transient or pulsed mode.

With the spectrometer initially set as above described, the free-induction signal, as detected in detector 42, corresponds to a zero of the dispersion resonance signal. The detected transient resonant free-induction-decay signal remains at zero intensity following each pump pulse. The saturation-recovery signal can be conveniently monitored using the weak nonsaturating observing microwave power in the observing channel. The automatic frequency control circuit operates on the observing mode such that the recovery signal is pure absorption.

The pulse repetition rate, as derived from the clock and divider circuit 56 and applied to PIN diode 22, is set at a repetition rate subject to the condition that the repetition period is greater than $T_1$, the longitudinal relaxation time of the sample. The square wave field modulation at the 50 hertz low frequency alternately steps on and off of resonance of the sample. The absorption resonance signal as detected in detector 42 is fed to one input of a preamplifier 78 of the receiver 54 for amplification and thence fed through a high pass filter 79 to a pulse amplifier 81. The output of the pulse amplifier 81 is fed to one input of a boxcar integrator 82.

In order to better analyze the transient signals, the boxcar integrator 82 is provided. The boxcar integrator 82 increases the signal-to-noise ratio of a repetitive transient waveform by gating some small portion of the waveform into an integrator many times, and slowly moving the gate along the waveform. IN the present instance, the boxcar integrator 82 includes PMOSFET device to gate the signal into an active integrator. The gating (or aperture) pulses are derived from a shift register and other digital circuitry within tne clock and divider circuit 56. The aperture is stepped at a slow rate by an amount equal to the aperture width, thus giving a staircase appearance to the resonance signals as recorder on recorder 55. In a typical example, there may be as many as 100 steps, i.e., aperture pulses, in stepping through a given transient response. The minimum aperture time is approximately 100 nanoseconds, about the same as the ringing time of the bimodal cavity 12.

The aperture width, aperture stepping rate, pump pulse repetition rate, pump pulse length, and 50 hertz square wave modulation of either the observing power or the magnetic field are all derived from the 10 $MH_z$ master clock 56. This type of coherent timing avoids problems of beating of harmonics of the various frequencies. The high pass filter 79 keeps low frequency noise from hitting the integrator gate and being unconverted to the repetition frequency. In the timing sequence, the pump power is turned on and off many times during each half cycle of the 50 hertz modulation.

The output of the boxcar integrator 82 is fed to one input of a phase sensitive detector 83 for phase sensitive detection against a sample of the 50 hertz square wave derived from the clock 56. The phase sensitive detection at 50 hertz is accomplished by alternately sampling the integrator output with two sample and hold circuits at the end of each half cycle. Following each sampling, the integrator 82 is dumped. The sample and hold circuits feed a differential amplifier whose output feeds a conventional RC filter of time constant somewhat less than the holding time for each step of the decay curve of the transient resonance signal being observed. Finally, the phase sensitive detected resonance signal is fed to the Y axis of the X-Y recorder 55. The X axis of the recorder 55 is stepped coincidentally with the steps in the aperture delay. Alternatively, the output of the RC filter at the output of the phase sensitive detector 83 may be fed to a logarithmic amplifier and then to the recorder 55.

As an alternative to field modulation at the low 50 hertz frequency and stepping on and off of resonance, the swith 65 can be set for modulating the amplitude of the observing power from a first to a second much lower level by switching the 50 hertz modulation onto PIN diode 47 in the observing channel. This modulation in the resonance signal as detected in detector 42 is then phase sensitive detected in phase sensitive detector 83 to reproduce the output resonance signal as recorded on recorder 55.

The free-induction-decay signals, as coupled through from the pump to the observing channel, do not depend on the level of the power in the observing mode of the bimodal cavity, whereas the saturation-recovery signals do depend on the level of the power in the observing mode. Thus, the phase sensitive detection of the detected resonance signal with 50 hertz modulation of the power level in the observing channel provides a means for separating the saturation-recovery signal from the free-induction-decay signal.

At the very low observing power level, a free-induction-decay signal is observed following a pump pulse, whereas at the higher observing power level the detected resonance signal is the superposition of the free-induction-decay signal and the saturation-recovery signal. Thus, the phase sensitive detection in the phase sensitive detector 83 provides an experimental means for subtracting the two decay signals, thereby cancelling the free-induction-decay signal and recording only the saturation-recovery signal. It is necessary that the observing power level during the high power portion of the cycle still be much less than required for saturation.

This latter method for separation of the saturation-recovery signal from the free-induction-decay signal may be employed without setting the spectrometer initially for a zero of the dispersion mode of the pump power coupled into the observing channel by resonance of the sample. However, improved results are obtained if both methods of separation of the saturation-recovery from the free-induction-decay are employed simultaneously, i.e., if the observing power level is modulated and the spectrometer is set for a zero of the dispersion of the pump mode and a peak of the absorption mode of the observing channel.

The detected saturation-recovery signal can be displayed as a function of polarizing magnetic field $H_o$ to yield a recorded EPR spectrum. This of utility for separating overlapping spectra from several paramagnetic species having different spin lattice relaxation times. In this mode of operation, the aperture delay is held constant for a given spectrum but varied from spectrum to spectrum to separate the overlapping spectra.

What is claimed is:

1. In a microwave spectrometer:

cavity resonator means for supporting electromagnetic fields of first and second orthogonal resonant modes of oscillation of said cavity resonator at the same frequency, said cavity resonator means having a common region shared by said first and second orthogonal modes of oscillation, and means for disposing a sample to be analyzed within said shared region of said cavity resonator means;

a source of microwave energy at the resonant frequency of said first and second orthogonal modes of oscillation;

first means for coupling microwave energy derived from said source of microwave energy to said cavity resonator means for exciting said first resonant mode of oscillation to the substantial exclusion of exciting said second mode of oscillation except for cross coupling of said first and second resonant modes due to resonance of the sample;

second means for coupling microwave energy derived from said source of microwave energy, and at the same frequency as coupled to said cavity resonator via said first coupling means, to said cavity resonator means for exciting said second resonant mode of oscillation to the substantial exclusion of exciting said first resonant of oscillation except for cross coupling of said first and second modes due to resonance of the sample; and means for detecting microwave resonance of the sample to be analyzed.

2. The apparatus of claim 1 including, means for variably adjusting the relative amplitudes of the microwave energy at the same frequency coupled into said first and second orthogonal resonant modes of said cavity resonator means via said first and second microwave coupling means.

3. The apparatus of claim 1 including means for variably adjusting the relative phases of the microwave energy at the same frequency coupled into said first and second orthogonal resonant modes of said cavity resonator means via said first and second microwave coupling means.

4. The apparatus of claim 1 wherein said first coupling means includes a circulator means having first, second and third ports, said first port of said circulator being connected to receive microwave energy from said microwave source means and to direct said received microwave power out of said second port to said cavity resonator means while directing microwave power in the opposite direction from said resonator means to said circulator and thence to said third port of said circulator means, microwave detector means coupled to receive microwave power coupled out of said third port of said circulator means for detecting same, reference arm means for bypassing microwave power from said microwave source means around said circulator means to said detector means for providing reference phase microwave energy to said detector means.

5. The apparatus of claim 1 including means for periodically pulsing the microwave excitation of said second mode of oscillation at a certain pulse repetition frequency to excite a corresponding train of free-induction-decay transient resonances of the sample with successive transient resonances alternating in time displaced relation with successive pulses of the microwave excitation, and means for changing the power level of excitation of said first mode of oscillation of said cavity from a nonsaturating power level to a lower power level, and means for obtaining the difference in the detected resonance signals corresponding to the two power levels.

6. The apparatus of claim 5 wherein said means for changing the power levels includes modulator means for modulating the power level of excitation of said first mode of oscillation of said cavity at a certain modulation frequency which is lower in frequency than the certain pulse repetition frequency, and wherein said means for obtaining the difference in the detected resonance signals includes means for synchronously detecting the modulation component at the certain modulation frequency in the resonant signal as detected by said microwave detector.

7. The apparatus of claim 1 including means for deriving the certain pulse repetition frequency and the certain modulation frequency from a common clock.

8. The apparatus of claim 1 including means for locking the frequency of said source of microwave energy to the resonant frequency of the first mode of oscillation of said bimodal cavity resonator.

9. The apparatus of claim 1 including means for periodically pulsing the microwave excitation of said second mode of oscillation at a certain pulse repetition frequency to excite a corresponding train of free-induction-decay transient resonances of the sample with successive transient resonances alternating in time displaced relation with successive pulses of the microwave excitation, and wherein said microwave detecting means comprises a transient detector for detecting the transient resonance signals.

10. The apparatus of claim 8 including means for sweeping the intensity of the polarizing magnetic field.

11. In a method for exciting and detecting electron paramagnetic resonance of a sample under analysis, the steps of:

disposing a sample under analysis in the shared field region of a bimodal cavity resonator disposed in a polarizing DC magnetic field, such bimodal cavity resonator being dimensioned and arranged for supporting first and second orthogonal electromagnetic modes of oscillation at the same frequency such that the sample is permeated by alternating magnetic fields of both modes and by the polarizing field in the same shared field region of said resonator, exciting both modes of oscillation of said cavity resonator with microwave energy at the same frequency and derived from a common source for exposing the sample to alternating magnetic fields of both resonant modes of oscillation at the same frequency to excite electron paramagnetic resonance of the sample; and detecting electron paramagnetic resonance of the sample.

12. The method of claim 11 including the step of setting the ratio of the frequency of the exciting microwave energy to the intensity of the polarizing magnetic field to the center of an excited electron paramagnetic resonance line of the sample under analysis, and wherein the step of detecting electron paramagnetic resonance of the sample includes the step of combining in a microwave detector a reference microwave signal derived from the microwave source with a second microwave signal component as coupled from the second mode to the first mode of the bimodal cavity, due to the resonance of the sample, adjusting the relative phase of the reference and said microwave signals to detect the dispersion mode of resonance of the sample as excited by alternating electromagnetic fields of the second mode of oscillation of said cavity resonator; and combining in the microwave detector a third microwave signal derived from the first mode of oscillation of the bimodal cavity resonator as influenced by resonance of the sample for detecting resonance of the sample.

13. The method of claim 12 including the step of modulating at a modulation frequency the power level of excitation of said first mode of oscillation of said bimodal cavity resonator to the substantial exclusion of such modulation of said second excited mode of oscillation of said bimodal cavity resonator, and synchronously detecting the modulation component in the resonance signal as detected by the microwave detector.

* * * * *